July 10, 1923.
J. F. MOODY
1,461,492
ELECTRICAL TESTING INSTRUMENT
Filed June 24, 1920
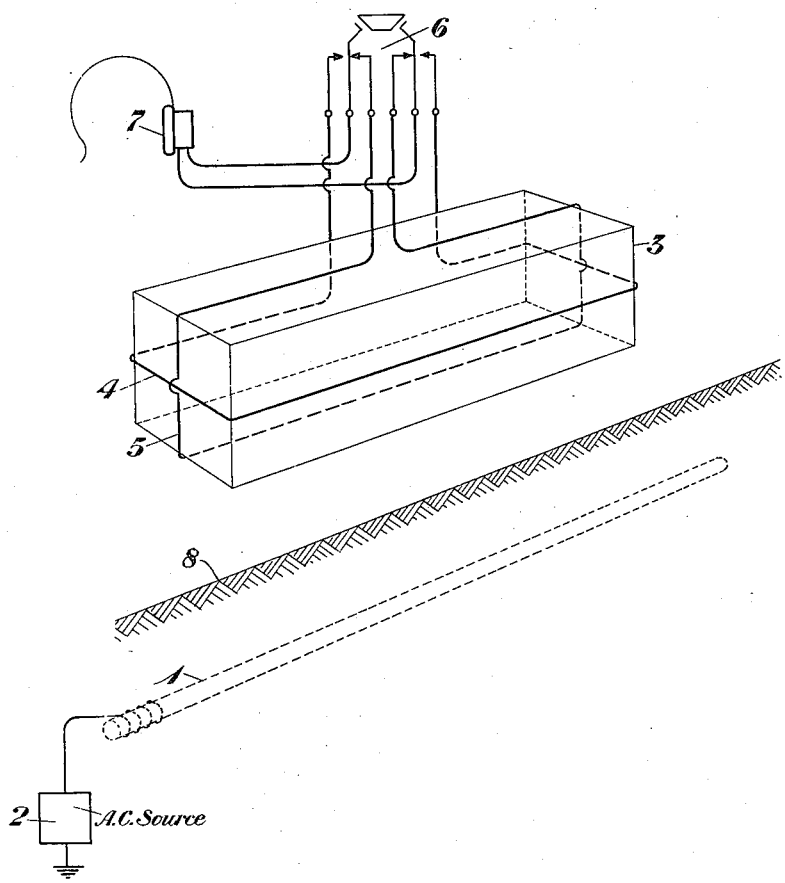
INVENTOR
J. F. Moody
BY
ATTORNEY Patented July 10, 1923.                                              1,461,492

UNITED STATES PATENT OFFICE.

JOHN F. MOODY, OF BROOKLYN, NEW YORK, ASSIGNOR TO AMERICAN TELEPHONE AND TELEGRAPH COMPANY, A CORPORATION OF NEW YORK.

ELECTRICAL TESTING INSTRUMENT.

Application filed June 24, 1920. Serial No. 391,502.

*To all whom it may concern:*

Be it known that I, JOHN F. MOODY, residing at Brooklyn, in the county of Kings and State of New York, have invented certain Improvements in Electrical Testing Instruments, of which the following is a specification.

This invention relates to electrical testing instruments, and especially to that type which, operating upon inductive principles, are adapted to locate concealed conductors through the medium of an alternating field surrounding the said conductors.

In the location of concealed conductors, such as, for example, buried pipes or cables, it has been customary heretofore to use a coil of wire connected with a telephone receiver, the said coil being usually rectangular or circular in shape. The magnetic field created by impressing an alternating current upon the concealed conductor would be detected as soon as the coil has been brought within the said field. The usual method pursued by the tester consisted in holding the coil in such position that its plane was approximately vertical to the ground, or other surface, above the concealed conductor, and moving the coil in the direction which showed an increase of current induced in the coil by the magnetic field surrounding the conductor. When the coil has been moved to a point approximately directly over the concealed conductor, the tester would gradually swing the coil, still suspended in the position in which its plane was approximately vertical to the surface over which it was being moved, until the tone in the receiver indicated the maximum current in the coil. A line in the plane of the coil, and parallel with the ground or surface, would indicate approximately the direction of the concealed conductor below the surface.

It is well known to those skilled in the art of testing that it is difficult in most instances to determine which position of the coil produces the maximum tone in the receiver due to the inability of the ear to distinguish slight differences when the volume of tone is great. Experience has shown that slight differences in tone may be much more readily detected when the volume of tone is small than when it is large. Therefore, in order to check the accuracy of the location made by the coil in vertical position, the said coil is rotated through an angle of 90 degrees so as to bring it to a horizontal position. In rotating the said coil from a vertical to a horizontal position, the tone in the receiver will diminish in magnitude, and will reach a minimum when the coil reaches its horizontal position. If the previous determination made with the coil in a vertical plane is accurate, and if the rotation of the coil has been effected about an axis lying in the said vertical plane and through the correct angular distance, no tone will be perceived in the receiver when the coil reaches a horizontal plane. Therefore, the position of the concealed conductor with respect to the coil is such that a line through the center of the coil and perpendicular to its plane will intersect the concealed conductor, and the direction in which the said conductor extends will be indicated by the axis about which the coil was rotated from its vertical to its horizontal position.

Experience has shown that, after making the preliminary determination with the coil in a vertical plane, it is impracticable to effect the rotation of the coil through an angle of exactly 90 degrees thereby increasing the difficulty of obtaining quickly an exact location of the concealed conductor, because of the extra movements necessary to obtain a balanced situation, evidenced by silence in the receiver.

It is the object of this invention to provide a device for locating concealed conductors, which enables the making of these two complementary determinations without rotating the locating device, and therefore increases the speed and accuracy with which the determinations may be made.

Other and further objects of this invention will be apparent from the following description when read in connection with the attached drawing showing one embodiment of the invention.

In the drawing, 1 represents a concealed conductor, as, for example, a buried pipe or cable, with which is connected a source of alternating current 2, which may be a buzzer of suitable current capacity or other means. 3 represents schematically the inductive locator comprising two windings 4 and 5, fixedly held so that their planes are perpendicular to each other. In the drawing I have purposely represented each winding by a single turn of wire, in order to simplify the illustrations, but it is to be understood that the invention is not thus limited, but each of the said windings may comprise as many turns of wire as may be found necessary in order to produce the desired result. The windings 4 and 5 are connected with a switch 6, to which is also connected a telephone receiver 7. One of the said windings 5 is connected with the inner contacts of the switch which normally are in contact with the movable contacts with which the receiver 7 is connected. The other winding 4 is connected with the outer contacts of the said switch, which may be brought into contact with the movable contacts by the operation of the push button associated with the said switch. Although the switch 6 is shown apart from the locator 3, it is to be understood that this has been done only to clarify the illustration, because, in practice, the switch would be attached to the locator so that it might be operated by a finger of the same hand with which the tester holds the locator.

Having in mind the foregoing description of the parts of this invention, it will now be more clearly understood from the following description of its mode of operation. Let it be assumed that an alternating current is being applied by a source 2 to the conductor 1 which, for example, is buried at a substantially uniform distance below the surface of the ground 8, and that the tester has begun to move the locator into the magnetic field that surrounds the buried conductor. Since the buried conductor is in the ground, the tester will carry the locator 3, holding it in such a position that the winding 5, normally connected to the receiver 7 over the inner contacts of the switch 6 will be in a position substantially vertical to the surface of the ground beneath which the buried conductor is located. As the locator approaches a position directly over the buried conductor, the strength of the induced current in the winding 5 will increase in magnitude, due to the increase in strength of the magnetic field into which the locator is being moved. When the locator is directly over the buried conductor, the tester will stop walking and will slowly move the locator from side to side, keeping the plane of the winding 5 substantially vertical, until the winding is in that position which apparently gives the maximum tone in the receiver 7. The tester will then hold the locator in this position, and will depress the button of the key 6, which serves to connect the winding 4 with the receiver 7. Since the planes of the windings are perpendicular, the plane of winding 4 will then be substantially horizontal and if the prior determination has been accurately made, that is to say, if the axis of the buried conductor 1 lies entirely within the plane of winding 5, no current will be induced in winding 4, and consequently no tone will be perceived in the receiver 7.

In practice, however, it has been found that, due to the volume of the tone in the receiver 7, when the locator is over the buried conductor, it is impracticable to determine exactly which position of winding 5 gives the maximum tone and therefore the axis of the buried conductor may not be exactly in the plane of winding 5. Consequently when the receiver is switched to winding 4 a tone may be perceived in the receiver, indicating that the alignment of the locator with respect to the buried conductor is not quite accurate. Upon perceiving this, the tester will vary the position of the locator 3 with respect to the apparent position of the buried conductor, keeping winding 4 in a vertical plane and continuing such movement until a point of silence is reached. In order to further check the accuracy of his determination, the tester may release the button of key 6, thereby reconnecting the winding 5 with the receiver 7, which produces the maximum tone in the receiver. This reconnection of the receiver with winding 5 serves also to assure the tester that the source of alternating current is operating properly, and consequently that the silent condition of the receiver when connected with winding 4 is due to a balanced situation and not to failure of the source of current to set up the magnetic field.

I have described this invention in connection with the location of a pipe or other conductor buried in the ground, but it is to be understood that it is capable of use in locating a conductor that may be concealed in substantially any manner, such as, for example, those located in walls or ceilings or floors of buildings. Furthermore, this invention is not limited in its mode of operation to that described, since for example, it is practicable to operate the device by bringing the locator into the magnetic field with the winding 4 connected with the receiver and adjusting its position until a silent point is reached, then connecting the winding 5 with the receiver so as to get the maximum tone. It is believed, however, that greater accuracy will be obtained by the method first described.

It is further to be understood that the invention is not limited to any particular shape or size of coils, since these features are governed largely by the conditions under which the locator is to be used. Thus, for example, it is well-known that in locating pipes or cables buried under ground large coils are desirable, whereas in locating concealed conductors in the walls or ceilings of buildings small coils are desirable. Furthermore, this invention is not limited to any particular type of core upon which the windings are placed, since this might be either a magnetic or nonmagnetic material.

Although this invention has been described as having a particular form of embodiment, it is to be understood that it is not limited to this specific form, but is capable of embodiment in other and different forms within the scope of the appended claims.

What is claimed is:

1. The method of locating concealed conductors, which consists in impressing an alternating electro-motive force upon the said conductor, moving into the magnetic field thus created a winding whose plane is substantially perpendicular to the surface moved over, adjusting the position of the said winding until the tone produced in a telephone receiver connected therewith is of maximum intensity, connecting the said receiver with a second winding whose axis is perpendicular to that of the said first winding, and adjusting the position of the said second winding relative to the said magnetic field until substantially no tone is perceived in the said receiver.

2. The method of locating a concealed conductor, which consists in moving a locator comprising two windings having their axes perpendicular to each other into the alternating magnetic field surrounding the said concealed conductor, holding the said locator so that one of the said windings is in a vertical plane, and adjusting the position of the said winding so that the induced current in the said vertical winding shall be substantially a maximum, and the current in the horizontal winding shall be substantially a minimum.

3. In a system for locating concealed conductors, the combination of a source of alternating electro-motive force connected with the said conductor and adapted to set up an alternating magnetic field around the said conductor, a locator comprising two windings whose planes are perpendicular to each other, and an indicating instrument adapted to be connected with either of said windings.

4. In a system for locating concealed conductors, the combination of a source of alternating electro-motive force connected with the said conductor and adapted to set up an alternating magnetic field around the said conductor, a locator comprising two windings so disposed relative to each other that when the current in one is substantially a maximum the current in the other will be substantially a minimum.

5. In a system for locating concealed conductors, the combination of a source of alternating electro-motive force connected with the said conductor and adapted to set up an alternating magnetic field around the said conductor, a locator comprising two windings whose planes are perpendicular to each other, a telephone receiver and switching means associated with the said locator adapted to connect the said receiver with either of said windings.

6. In a system for locating concealed conductors, the combination of a source of alternating electro-motive force connected with the said conductor and adapted to set up an alternating magnetic field around the said conductor, a locator comprising two windings so disposed relative to each other that when the current in one is substantially a maximum the current in the other will be substantially a minimum, and indicating means adapted to be connected with either of said windings to indicate the current strength therein.

7. A locator of concealed conductors, comprising two non-oscillatory windings fixedly held relative to each other in such position that their planes are substantially perpendicular, and switching means associated therewith adapted to connect either of said windings to a current indicating instrument.

8. A locator of concealed conductors, comprising two non-oscillatory windings so disposed upon a magnetic core that their planes will be substantially perpendicular, and switching means associated therewith adapted to connect either of said windings to a current indicating instrument.

9. A locator of concealed conductors, comprising two substantially rectangular shaped coils, the planes of which are substantially perpendicular to each other, constituting non-oscillatory circuits, and switching means associated therewith adapted to connect either of said coils to a current indicating instrument.

In testimony whereof, I have signed my name to this specification this 23rd day of June, 1920.

JOHN F. MOODY.